United States Patent
Kim et al.

(10) Patent No.: US 12,405,649 B2
(45) Date of Patent: Sep. 2, 2025

(54) HEAT MANAGEMENT CIRCUIT, METHOD FOR OPERATING THE SAME, AND ELECTRONIC DEVICE AND DATA PROCESSING APPARATUS INCLUDING THE SAME

(71) Applicant: SK hynix Inc., Gyeonggi-do (KR)

(72) Inventors: Jeong Hyun Kim, Gyeonggi-do (KR); Sung Ju Yoo, Gyeonggi-do (KR); Ji Hun Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 277 days.

(21) Appl. No.: 17/958,521

(22) Filed: Oct. 3, 2022

(65) Prior Publication Data
US 2023/0288971 A1 Sep. 14, 2023

(30) Foreign Application Priority Data
Mar. 8, 2022 (KR) .................. 10-2022-0029242

(51) Int. Cl.
*G06F 1/20* (2006.01)
(52) U.S. Cl.
CPC .................. *G06F 1/206* (2013.01)
(58) Field of Classification Search
CPC ....................................... G06F 1/206
See application file for complete search history.

(56) References Cited

U.S. PATENT DOCUMENTS

| | | | | |
|---|---|---|---|---|
| 2006/0021358 A1* | 2/2006 | Nallapa | ............ | H02K 9/24 62/126 |
| 2009/0190625 A1* | 7/2009 | Chung | ............ | G06F 1/206 415/118 |
| 2011/0093132 A1* | 4/2011 | Tan | ............ | G06F 1/206 700/299 |
| 2014/0025207 A1* | 1/2014 | Kanbara | ............ | F25D 29/00 700/275 |
| 2016/0378149 A1* | 12/2016 | Kam | ............ | G06F 1/3225 713/320 |
| 2018/0018006 A1* | 1/2018 | Kudo | ............ | G06F 11/3058 |
| 2022/0124616 A1* | 4/2022 | Yu | ............ | H04W 52/0225 |

FOREIGN PATENT DOCUMENTS

| | | |
|---|---|---|
| KR | 10-0953441 B1 | 4/2010 |
| KR | 10-2017-0037609 A | 4/2017 |
| KR | 10-2017-0059164 A | 5/2017 |

* cited by examiner

*Primary Examiner* — Suresh Suryawanshi
(74) *Attorney, Agent, or Firm* — IP & T GROUP LLP (57) ABSTRACT

A heat management circuit may include a throttling circuit configured to cool, for a predetermined time amount, at least one semiconductor functional circuit, which is designed to perform a predetermined function, when a plurality of first temperature signals respectively transmitted from a plurality of temperature sensors installed in the semiconductor functional circuit satisfy a throttling condition; and an analysis unit configured to receive, after lapse of the predetermined time amount, a plurality of second temperature signals from the respective temperature sensors, determine whether the cooling is successful or fails, and detect a temperature sensor having outputted a second temperature signal of abnormal value when the cooling is determined to fail.

20 Claims, 8 Drawing Sheets

HEAT MANAGEMENT CIRCUIT, METHOD FOR OPERATING THE SAME, AND ELECTRONIC DEVICE AND DATA PROCESSING APPARATUS INCLUDING THE SAME

CROSS-REFERENCES TO RELATED APPLICATION

The present application claims priority under 35 U.S.C. § 119(a) to Korean patent application number 10-2022-0029242, filed on Mar. 8, 2022, which is incorporated herein by reference in its entirety.

BACKGROUND

1. Technical Field

The present technology relates to a semiconductor integrated device, and more particularly, to a heat management circuit, a method for operating the same, and an electronic device and a data processing apparatus including the same.

2. Related Art

The improvement of the performance of an electronic device causes an increase in power consumption and a temperature increase due to the increase in power consumption.

Accordingly, when the temperature of the electronic device increases by more than a threshold, a throttling function is adopted to substantially maintain or lower the temperature by decreasing the performance of the electronic device or limiting the function thereof.

A system for providing a centralized data processing service such as a data platform and a data center is constructed so that a plurality of electronic devices operate independently or cooperatively. In such a case, since the entire system may be stopped due to a rise in the temperature of any one of the electronic devices, a method capable of appropriately handling with various heat generation conditions of each electronic device is required.

SUMMARY

A heat management circuit in accordance with an embodiment of the present technology may include: a throttling circuit configured to cool, for a predetermined time amount, at least one semiconductor functional circuit, which is designed to perform a predetermined function, when a plurality of first temperature signals respectively transmitted from a plurality of temperature sensors installed in the semiconductor functional circuit satisfy a throttling condition; and an analysis unit configured to receive, after lapse of the predetermined time amount, a plurality of second temperature signals from the respective temperature sensors, determine whether the cooling is successful or fails, and detect a temperature sensor having outputted a second temperature signal of abnormal value when the cooling is determined to fail.

A method for operating a heat management circuit in accordance with an embodiment of the present technology may include: receiving a plurality of first temperature signals from a plurality of temperature sensors, respectively, installed in at least one semiconductor functional circuit designed to perform a predetermined function; cooling the functional circuit for a predetermined time amount when the first temperature signals satisfy a throttling condition; receiving, after lapse of the predetermined time amount, a plurality of second temperature signals from the respective temperature sensors; determining whether cooling is successful or fails; and detecting a temperature sensor having outputted a second temperature signal of abnormal value when the cooling is determined to fail.

An electronic device in accordance with an embodiment of the present technology may include: at least one semiconductor functional circuit designed to perform a predetermined function; a plurality of temperature sensors configured to detect a temperature of the functional circuit; a throttling circuit configured to limit an operation of the functional circuit for a predetermined time amount when a first representative temperature calculated on the basis of first temperature signals respectively received from the plurality of temperature sensors is equal to or greater than a first threshold; and an analysis unit configured to determine, when a second representative temperature calculated from second temperature signals received from the respective temperature sensors after lapse of the predetermined time amount is equal to or greater than a second threshold, a cause of heat generation on a basis of deviations of the second temperature signals.

A data processing apparatus in accordance with an embodiment of the present technology may include: a data storage device including at least one semiconductor functional circuit, which includes at least a memory device and is designed to perform a predetermined function, and a plurality of temperature sensors for detecting temperatures of the functional circuit and the memory device; and a controller configured to limit operations of the functional circuit and the memory device for a predetermined time amount when a first representative temperature calculated on a basis of first temperature signals respectively received from the plurality of temperature sensors is equal to or greater than a first threshold, and determine, when a second representative temperature calculated from second temperature signals received from the respective temperature sensors after lapse of the predetermined time amount is equal to or greater than a second threshold, a cause of heat generation on a basis of deviations of the second temperature signals.

An electronic device in accordance with an embodiment of the present technology may include: a first circuit; one or more sensors configured to sense first and second groups of temperatures of respective parts within the first circuit at respective first and second time points, the second time point being subsequent to the first time point; and a second circuit configured to: control the first circuit to cool down based on the first group, determine as abnormal, when a representative temperature of the second group is higher than a first threshold and a deviation of the second group is higher than a second threshold, one of the sensors that corresponds to the deviation higher than the second threshold, and determine as abnormal, when the representative temperature is higher than the first threshold and any deviation of the second group is not higher than the second threshold, a periphery of one of the parts that corresponds to a greatest deviation of the second temperatures.

DETAILED DESCRIPTION

Hereinafter, embodiments of the present technology will be described in more detail with reference to the accompanying drawings.

Figure 1:
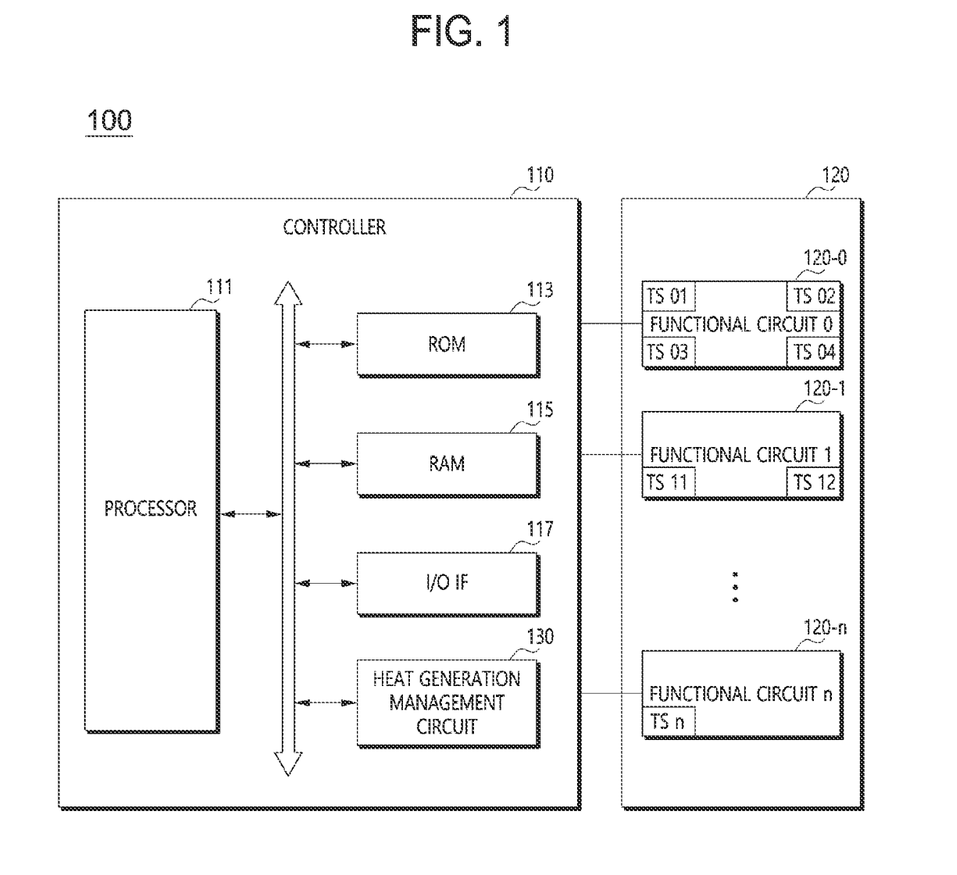
FIG. 1 is a configuration diagram of an electronic device in accordance with an embodiment of the present disclosure.

FIG. 1 is a configuration diagram of an electronic device 100 in accordance with an embodiment of the present disclosure.

Referring to FIG. 1, the electronic device 100 in accordance with an embodiment may include a controller 110 and a functional circuit group 120.

The functional circuit group 120 includes a plurality of functional circuits 120-0 to 120-$n$, and each of the functional circuits 120-0 to 120-$n$ may be a semiconductor device that can be integrated into a system on chip (SoC). A functional circuit or a semiconductor device may be configured to perform a predetermined function. A functional circuit or a semiconductor device may be referred to as a circuit, a logic, and the like.

In the functional circuits 120-0 to 120-$n$, temperature sensors TS01 to TS04, TS11 to TS12, and TSn may be installed. The numbers of temperature sensors installed in the respective functional circuits 120-0 to 120-$n$ may be the same as or different from one another. Each of the temperature sensors TS01 to TS04, TS11 to TS12, and TSn may be given a unique identifier ID and may transmit, to the controller 110, a temperature signal obtained by measuring the temperature of a corresponding one of the functional circuits 120-0 to 120-$n$ or the surroundings thereof. As can be seen from FIG. 1, the temperature sensors may sense different parts within a single functional circuit. For example, the temperature sensors TS01 to TS04 may be disposed in different locations within the functional circuit 120-0. Therefore, even when mounted in the single functional circuit, the temperature sensors may sense temperatures of different parts within the single functional circuit and peripheries of the respective parts and the sensed temperatures may be different from one another.

In an embodiment, at least one of the functional circuits 120-0 to 120-$n$ may be a data storage device, and in such a case, the electronic device 100 may be referred to as a data processing device. The data storage device may be configured as a volatile and/or nonvolatile memory device. In an embodiment, the data storage device may be implemented using a memory element selected from various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

The data storage device may include a plurality of dies Die 0 to Die n, a plurality of chips, or a plurality of packages, and function as a single-level cell (SLC) that stores one-bit data in one memory cell or a multi-level cell (MLC) that stores multiple bits of data in one memory cell. In such a case, a temperature sensor may be provided for each of the plurality of dies, chips, and packages.

The controller 110 may include a processor 111, a ROM 113, a RAM 115, an input/output interface (I/O IF) 117, a heat management circuit 130, and may be configured to control the functional circuits 120-0 to 120-$n$ constituting the functional circuit group 120.

The processor 111 may operate by executing, on hardware, firmware provided to control various operations of the functional circuits 120-0 to 120-$n$.

The ROM 113 may store program codes required for the operation of the controller 110, for example, firmware or software, code data used by the program codes, and the like.

The RAM 115 may store data required for the operation of the controller 110, or data generated by the controller 110.

The I/O IF 117 may include an external interface device for providing a physical connection between the electronic device 100 and an external device, for example, a host device on which the electronic device 100 is mounted. The I/O IF 117 may further include a functional circuit interface device for providing a physical connection between the controller 110 and the functional circuit group 120.

In an embodiment, the external interface device may provide interfacing with the electronic device 100 according to a bus format of the external device. The bus format of the external device may include at least one of communication standards or interfaces such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI express (PCI-e or PCIe), and a universal flash storage (UFS).

The external interface device may further include at least one of interface devices based on system management bus (SMBus), inter-integrated circuit (I2C), and improved inter-integrated circuit (I3C) protocols.

The functional circuit interface device may provide a communication channel for signal transmission/reception between the controller 110 and the functional circuit group 120.

The heat management circuit 130 may control the heat state of the functional circuit group 120 on the basis of the temperature signals transmitted from the temperature sensors TS01 to TS04, TS11 to TS12, and TSn. In an embodiment, when a first representative temperature calculated from a first temperature signal set transmitted from the temperature sensors TS01 to TS04, TS11 to TS12, and TSn, for example, an average temperature is equal to or greater than a first threshold, the heat management circuit 130 may perform a throttling operation of cooling the functional circuits 120-0 to 120-$n$ by limiting the operations of the functional circuits 120-0 to 120-$n$ for a predetermined time amount. In order to limit the operations of the functional circuits 120-0 to 120-$n$, the heat management circuit 130 may power off the functional circuits 120-0 to 120-$n$; however, the present technology is not limited thereto.

When the functional circuit group 120 is not normally cooled through the throttling operation, the heat management circuit 130 may analyze the cause of heat generation. In an embodiment, after the functional circuits 120-0 to 120-n are cooled for the predetermined time amount, when a second representative temperature calculated from a second temperature signal set transmitted from the temperature sensors TS01 to TS04, TS11 to TS12, and TSn is equal to or greater than a second threshold, the heat management circuit 130 may determine that the throttling operation, that is, cooling has failed. When it is determined that the cooling has failed, the heat management circuit 130 may determine that the cause of heat generation is not the internal heat of the electronic device 100, and analyze the cause of heat generation.

In an embodiment, the heat management circuit 130 may detect at least one of the temperature sensors TS01 to TS04, TS11 to TS12, and TSn, which outputs a second temperature signal of abnormal value among the second temperature signal set. In an embodiment, the heat management circuit 130 may determine, as the second temperature signal of abnormal value, a second temperature signal having a deviation equal to or greater than a threshold among the second temperature signal set, and determine that a heat generation situation is detected due to an error of at least one of the temperature sensors TS01 to TS04, TS11 to TS12, and TSn, which outputs the second temperature signal of abnormal value. When any second temperature signal having the deviation equal to or greater than the threshold is not detected, the heat management circuit 130 may determine, as the second temperature signal of abnormal value, a second temperature signal having the maximum deviation among the second temperature signal set, and determine that a heat generation situation is detected due to heat in an environment around at least one of the temperature sensors TS01 to TS04, TS11 to TS12, and TSn, which outputs the second temperature signal of abnormal value.

The heat management circuit 130 may transmit a result of analyzing the cause of heat to the external device, and an operator of the external device may take corresponding measures.

Figure 2:
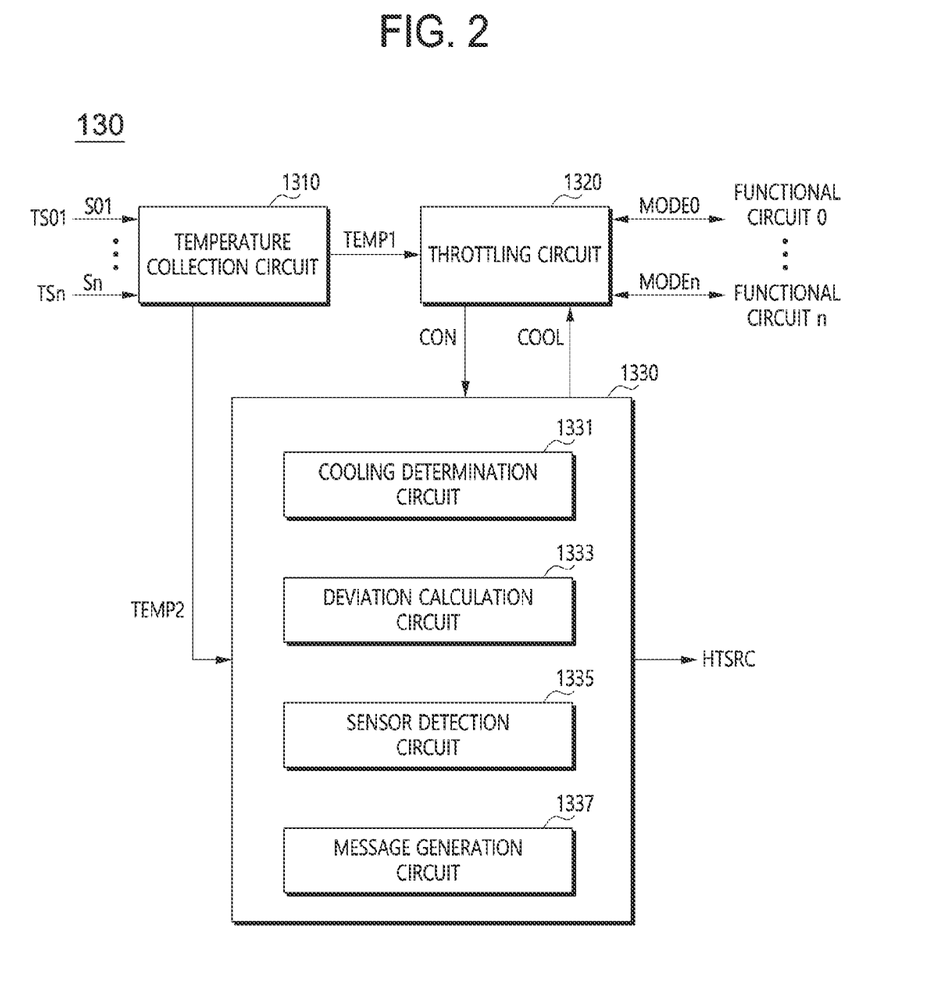
FIG. 2 is a configuration diagram of a heat management circuit in accordance with an embodiment of the present disclosure.

FIG. 2 is a configuration diagram of the heat management circuit 130 in accordance with an embodiment of the present disclosure.

Referring to FIG. 2, the heat management circuit 130 in accordance with an embodiment may include a temperature collection circuit 1310, a throttling circuit 1320, and an analysis unit 1330.

The temperature sensors TS01 to TSn may output temperature signals S01 to Sn at a set period, respectively, and the temperature collection circuit 1310 may receive and store the temperature signals S01 to Sn.

The throttling circuit 1320 may receive a first temperature signal set TEMP1 from the temperature collection circuit 1310, determine whether throttling is required, and output mode control signals MODE0 to MODEn to the functional circuits 120-0 to 120-n, respectively. In an embodiment, the first temperature signal set TEMP1 may include first temperature signals S01 to Sn transmitted from the plurality of temperature sensors TS01 to TSn. The throttling circuit 1320 may calculate a first representative temperature from the first temperature signal set TEMP1, compare the first representative temperature with a first threshold, and determine whether throttling, that is, cooling is required. The first representative temperature may be an average temperature of the first temperature signals S01 to Sn included in the first temperature signal set TEMP1; however, the present technology is not limited thereto.

When the first representative temperature is equal to or greater than the first threshold, the throttling circuit 1320 may output the mode control signals MODE0 to MODEn as a first logic value in order to limit the performance of each of the functional circuits 120-0 to 120-n. For example, the first logic value may be a signal for powering off the functional circuits 120-0 to 120-n. By limiting the operations of the functional circuits 120-0 to 120-n by powering off the functional circuits 120-0 to 120-n, power consumption of the functional circuits 120-0 to 120-n may be prevented to suppress further heat generation, thereby cooling the functional circuits 120-0 to 120-n.

The throttling circuit 1320 may transmit the mode control signals MODE0 to MODEn each having the first logic value to the functional circuits 120-0 to 120-n, and transmit a control signal CON for requesting the analysis unit 1330 to analyze the cause of heat generation after the lapse of a predetermined time amount.

The analysis unit 1330 may receive a second temperature signal set TEMP2 from the temperature collection circuit 1310 in response to the control signal CON, and analyze the cause of heat generation. The second temperature signal set TEMP2 may include a plurality of second temperature signals S01 to Sn detected from the plurality of temperature sensors TS01 to TSn after the lapse of the predetermined time amount. The analysis unit 1330 may determine whether cooling is successful, on the basis of the second temperature signal set TEMP2, and detect a temperature sensor having outputted a second temperature signal of abnormal value when the cooling has failed.

In an embodiment, the analysis unit 1330 may include a cooling determination circuit 1331, a deviation calculation circuit 1333, a sensor detection circuit 1335, and a message generation circuit 1337.

The cooling determination circuit 1331 may calculate a second representative temperature, for example, an average temperature, from the second temperature signal set TEMP2, compare the second representative temperature with a second threshold, and determine whether cooling is successful. When the second representative temperature of the second temperature signal set TEMP2 is lower than the second threshold, the cooling determination circuit 1331 may determine that the cooling is successful, and transmit a throttling success signal COOL to the throttling circuit 1320.

The throttling circuit 1320 may transmit mode control signals MODE0 to MODEn each having a second logic value to the functional circuits 120-0 to 120-n, respectively, in response to the throttling success signal COOL. The second logic value may be a signal for allowing the functional circuits 120-0 to 120-n to be restored to a state before the performance limitation.

The deviation calculation circuit 1333 may calculate an average and a deviation of the second temperature signals S01 to Sn included in the second temperature signal set TEMP2 when the second representative temperature of the second temperature signal set TEMP2 is equal to or greater than the second threshold.

When at least one temperature sensor having outputted a second temperature signal having a deviation equal to or greater than a third threshold is detected on the basis of the calculation result of the deviation calculation circuit 1333, the sensor detection circuit 1335 may specify the detected temperature sensor as an abnormal temperature sensor and set a heat code. When the temperature sensor having outputted the second temperature signal having the deviation equal to or greater than the third threshold is not detected, the sensor detection circuit 1335 may specify, as an abnormal temperature sensor, a temperature sensor having outputted a second temperature signal having the maximum deviation, and set a heat code.

The heat code is a code which describes the cause of heat generation. When the temperature sensor having outputted the second temperature signal having the deviation equal to or greater than the third threshold is detected from the second temperature signal set TEMP2, the heat code may be set as a predefined first value in order to indicate that the cause of heat generation is the temperature sensor. When the temperature sensor having outputted a second temperature signal having the deviation equal to or greater than the third threshold is not detected from the second temperature signal set TEMP2 and the temperature sensor having outputted the second temperature signal having the maximum deviation is detected from the second temperature signal set TEMP2, the heat code may be set as a predefined value in order to indicate that the cause of heat generation is in the environment around the temperature sensor having outputted the second temperature signal having the maximum deviation.

The sensor detection circuit 1335 may transmit the heat code and an ID of the abnormal temperature sensor to the message generation circuit 1337.

The message generation circuit 1337 may generate analysis information HTSRC including the heat code, the ID of the abnormal temperature sensor, the second temperature signal transmitted from the abnormal temperature sensor, and the deviation, then transmit the analysis information HTSRC to the external device. In an embodiment, the analysis information HTSRC may be transmitted through at least one of the interface devices based on the SMBus, the I2C, and the I3C protocols.

For example, the second temperature signal set TEMP2 is transmitted from first to twelfth temperature sensors TS1 to TS12 as shown in Table 1 below.

TABLE 1

|  | Temperature sensor | | | | | |
| --- | --- | --- | --- | --- | --- | --- |
|  | TS1 | TS2 | TS3 | TS4 | TS5 | TS6 |
| TEMP2 (S0-S12) (°C.) | 45 | 42 | −127 | 40 | 47 | 43 |
| Devation (°C.) | 15.5 | 12.5 | −156.5 | 10.5 | 17.5 | 13.5 |

|  | Temperature sensor | | | | | | |
| --- | --- | --- | --- | --- | --- | --- | --- |
|  | TS7 | TS8 | TS9 | TS10 | TS11 | TS12 | Average |
| TEMP (S0-S12) (°C.) | 44 | 45 | 45 | 43 | 44 | 43 | 29.5 |
| Devation (°C.) | 14.5 | 15.5 | 15.5 | 13.5 | 14.5 | 13.5 | 0 |

The cooling determination circuit 1331 determines that the throttling operation has failed when the second representative temperature (average temperature is 29.5° C.) of the second temperature signal set TEMP2 is equal to or greater than the second threshold (for example, 29° C.). Accordingly, the deviation calculation circuit 1333 may calculate the average and the deviation of the second temperature signals S0 to Sn included in the second temperature signal set TEMP2.

On the basis of the calculation result of the deviation calculation circuit 1333, the sensor detection circuit 1335 may detect the temperature sensor TS3 having outputted the second temperature signal having a deviation equal to or greater than the third threshold (for example, 10° C.). The sensor detection circuit 1335 may specify the temperature sensor TS3 as an abnormal temperature sensor, and set a heat code (for example, 0x0) indicating that the cause of heat generation is in the temperature sensor.

The analysis information HTSRC generated by the message generation circuit 1337 on the basis of the above operation is, for example, as shown in Table 2 below.

TABLE 2

| Heat code | Sensor ID | Temperature (° C.) | Deviation ° C. |
| --- | --- | --- | --- |
| 0x0 | S3 | −127 | −156.5 |

For example, the second temperature signal set TEMP2 is transmitted from the first to twelfth temperature sensors TS1 to TS12 as shown in Table 3 below.

TABLE 3

|  | Temperature sensor | | | | | |
| --- | --- | --- | --- | --- | --- | --- |
|  | TS1 | TS2 | TS3 | TS4 | TS5 | TS6 |
| TEMP2 (S0-S12) (°C.) | 73 | 71 | 70 | 67 | 80 | 79 |
| Devation (°C.) | −3 | −5 | −6 | −9 | 4 | 3 |

|  | Temperature sensor | | | | | | |
| --- | --- | --- | --- | --- | --- | --- | --- |
|  | TS7 | TS8 | TS9 | TS10 | TS11 | TS12 | Average |
| TEMP (S0-S12) (°C.) | 77 | 75 | 82 | 81 | 81 | 80 | 76 |
| Deviation (°C.) | 1 | −1 | 6 | 5 | 5 | 4 | 4 |

The cooling determination circuit 1331 determines that the throttling operation has failed when the second representative temperature (average temperature is 76° C.) of the second temperature signal set TEMP2 is equal to or greater than the second threshold (for example, 29° C.). Accordingly, the deviation calculation circuit 1333 may calculate the average and the deviation of the second temperature signals S0 to Sn included in the second temperature signal set TEMP2.

Since there is no temperature sensor having outputted the second temperature signal having a deviation equal to or greater than the third threshold (for example, 10° C.), the sensor detection circuit 1335 may detect the temperature sensor TS9 having the maximum deviation and specify the temperature sensor TS9 having the maximum deviation as an abnormal temperature sensor. In addition, the sensor detection circuit 1335 may set a heat code (for example, 0x1) indicating that the cause of heat generation is in the environment around the temperature sensor TS9.

The analysis information HTSRC generated by the message generation circuit 1337 on the basis of the above operation is, for example, as shown in Table 4 below.
Table 4

TABLE 4

| Heat code | Sensor ID | Temperature (° C.) | Deviation ° C. |
| --- | --- | --- | --- |
| 0x1 | S9 | 82 | 65 |

The external device may provide the analysis information HTSRC to an operator, and the operator may take measures, such as replacing or repairing a sensor or removing the cause of heat generation from the vicinity of the sensor, on the basis of the information included in the analysis information HTSRC.

Figure 3:
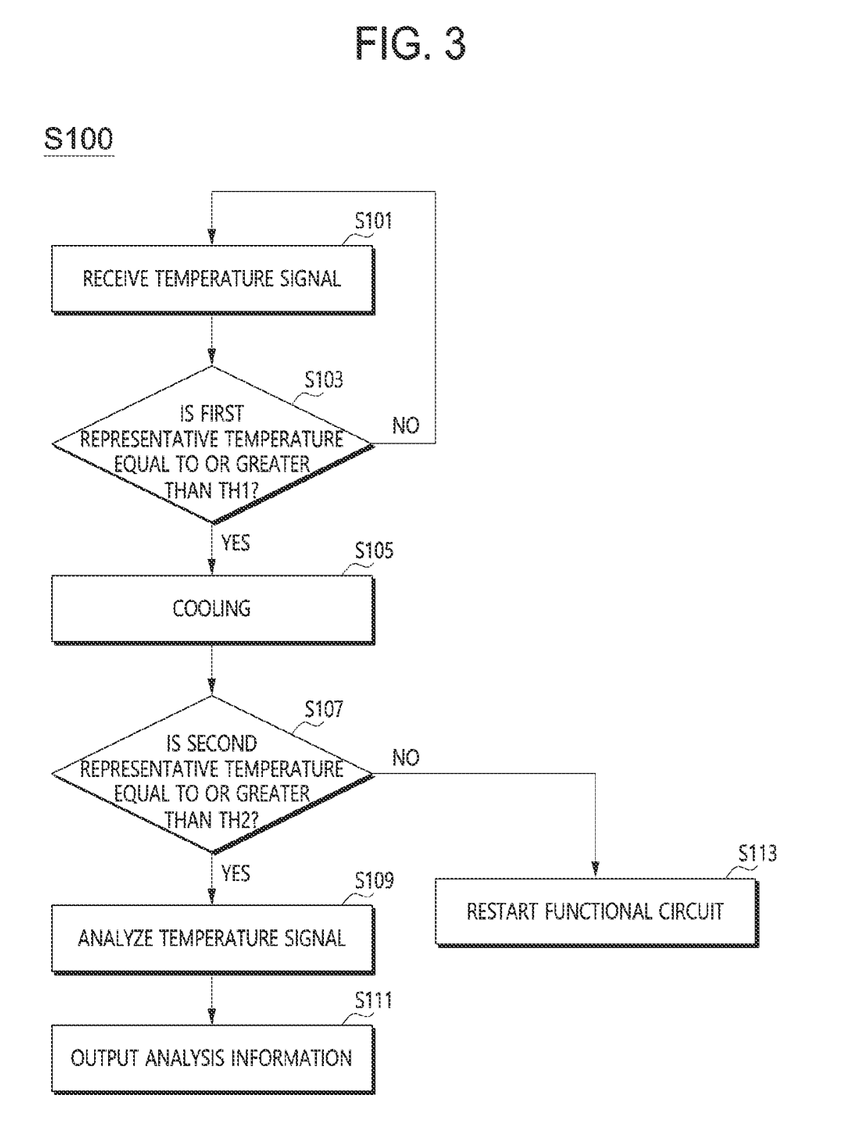
FIG. 3 is a flowchart for describing an operating method of the electronic device in accordance with an embodiment of the present disclosure.

FIG. 3 is a flowchart for describing an operating method of the electronic device 100 in accordance with an embodiment of the present disclosure.

The temperature sensors TS01 to TSn installed in the functional circuit group 120 of the electronic device 100 may output the temperature signals S01 to Sn at a set period, respectively. The controller 110 including the heat management circuit 130 may receive the first temperature signals S01 to Sn (S101), calculate the first representative temperature, and compare the first representative temperature with a first threshold TH1 (S103). The first representative temperature may be, for example, an average of a set of temperature signals collected at a specific time; however, the present technology is not limited thereto.

When the first representative temperature is smaller than the first threshold TH1 (S103: N), the controller 110 may receive the first temperature signals (S101), and continuously monitor whether heat is generated.

When the first representative temperature is equal to or greater than the first threshold TH1 (S103: Y), the controller 110 may cool the functional circuit group 120 (S105). In an embodiment, in order to cool the functional circuit group 120, the controller 110 may output the mode control signals MODE0 to MODEn each having the first logic value for limiting the performance of the functional circuit group 120. For example, the first logic value may be a signal for powering off the functional circuit group 120.

When the predetermined time amount lapses after the mode control signals MODE0 to MODEn for performance limitation is transmitted, the controller 110 may calculate the second representative temperature from the second temperature signals S01 to Sn received from the plurality of temperature sensors TS01 to TSn, and compare the second representative temperature with a second threshold TH2 (S107). In an embodiment, the second threshold TH2 may be a value smaller than the first threshold TH1.

When the second representative temperature is equal to or greater than the second threshold TH2 (S107: Y), the controller 110 may analyze the cause of heat generation on the basis of the second temperature signals S01 to Sn (S109), and the analysis result to the external device (S111). When the second representative temperature is smaller than the second threshold TH2 (S107: N), the controller 110 may restart the functional circuit upon determining that cooling is successful.

Figure 4:
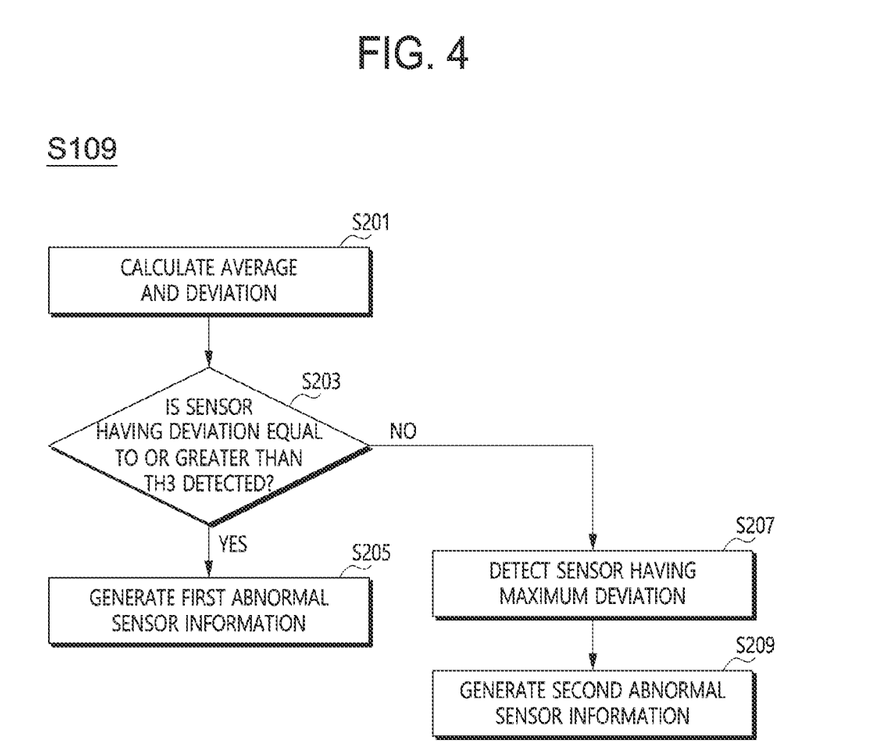
FIG. 4 is a flowchart for describing an operating method of the electronic device in accordance with an embodiment of the present disclosure.

FIG. 4 is a flowchart for describing an operating method of the electronic device 100 in accordance with an embodiment of the present disclosure, and is a detailed flowchart of the temperature signal analysis process S109 illustrated in FIG. 3.

The controller 110 may calculate the average and the deviation of the second temperature signals S01 to Sn (S201), and check whether a temperature sensor having outputted a temperature signal having a deviation equal to or greater than a third threshold TH3 is detected (S203).

When the temperature sensor having outputted the temperature signal having the deviation equal to or greater than the third threshold TH3 is detected (S203: Y), the controller 110 may specify the detected temperature sensor as an abnormal temperature sensor, and generate first abnormal sensor information including a heat code and a sensor ID (S205). The heat code may be set as a predefined first value in order to indicate that the cause of heat generation is in the temperature sensor.

When the temperature sensor having outputted the temperature signal having the deviation equal to or greater than the third threshold TH3 is not detected (S203: N), the controller 110 may detect a temperature sensor having outputted a second temperature signal having the maximum deviation, specify the detected temperature sensor as an abnormal temperature sensor (S207), and generate second abnormal sensor information including a heat code and a sensor ID (S209). The heat code may be set as a predefined value in order to indicate that the cause of heat generation is in the environment around the temperature sensor having outputted the second temperature signal having the maximum deviation.

Accordingly, in the analysis information output process (S111) of FIG. 3, the controller 110 may generate the analysis information HTSRC including the heat code, the ID of the abnormal temperature sensor, the temperature signal transmitted from the abnormal temperature sensor, and the deviation, then transmit the analysis information HTSRC to the external device.

Although heat of the electronic device 100 is detected and power-off throttling is performed, the temperature signals S01 to Sn indicating an abnormal temperature value sensed by the temperature sensors TS01 to TS04, TS11 to TS12, and TSn may not be caused by the functional circuits 120-0 to 120-n. The temperature signals S01 to Sn indicating an abnormal temperature value may be caused by erroneous sensing of the temperature sensors TS01 to TS04, TS11 to TS12, and TSn or may be caused by the environments around the temperature sensors TS01 to TS04, TS11 to TS12, and TSn.

According to the present technology, it is possible to accurately analyze whether the cause of heat generation is in an electronic device itself, a temperature sensor problem, or a problem outside the electronic device, and deal with the analyzed contents. Consequently, there is no need to unnecessarily power off the electronic device, and the cause of heat generation can be adaptively removed according to the analyze result.

Figure 5:
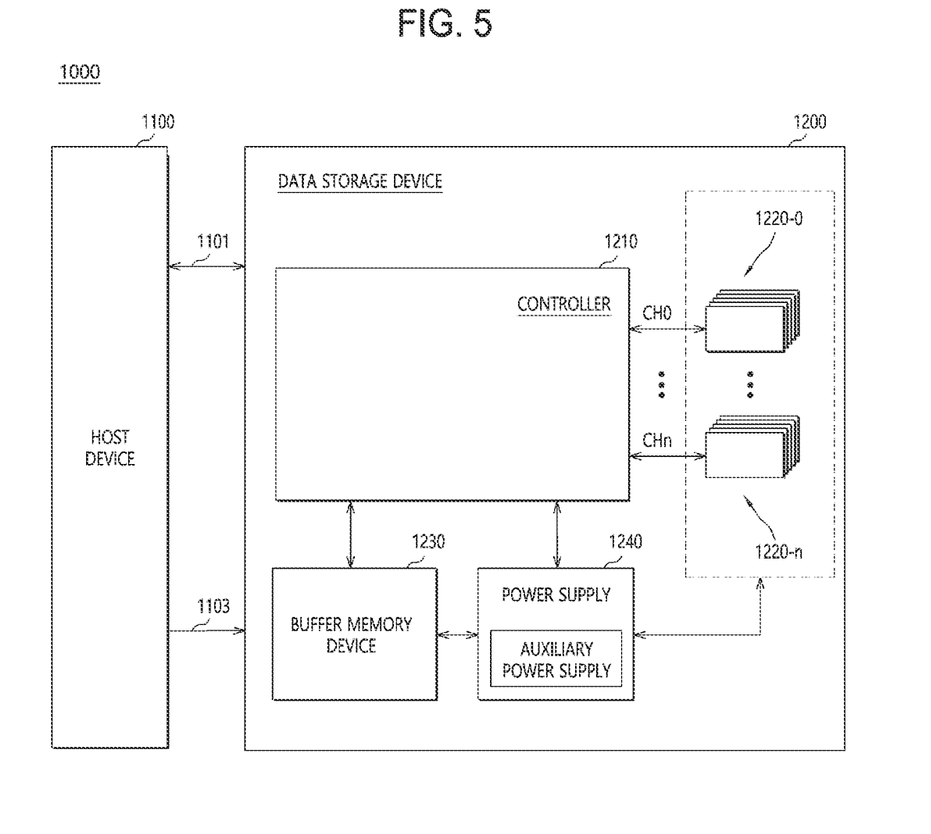
FIG. 5 is a diagram illustrating a data storage system in accordance with an embodiment of the present disclosure.

FIG. 5 is a diagram illustrating a data storage system 1000, in accordance with an embodiment of the present disclosure.

Referring to FIG. 5, the data storage 1000 may include a host device 1100 and the data storage device 1200. In an embodiment, the data storage device 1200 may be configured as a solid state drive (SSD).

The host device 1100 may be referred as the external device, and the data storage device 1200 may be the electronic device 100 illustrated in FIGS. 1 and 2.

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may include heat management circuit 130 shown in FIGS. 1 and 2. The controller 1210 analyzes the cause of heat generation of the functional circuits including the nonvolatile memory devices 1220-0 to 1220-n and may output results of the analysis to the external device.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 6:
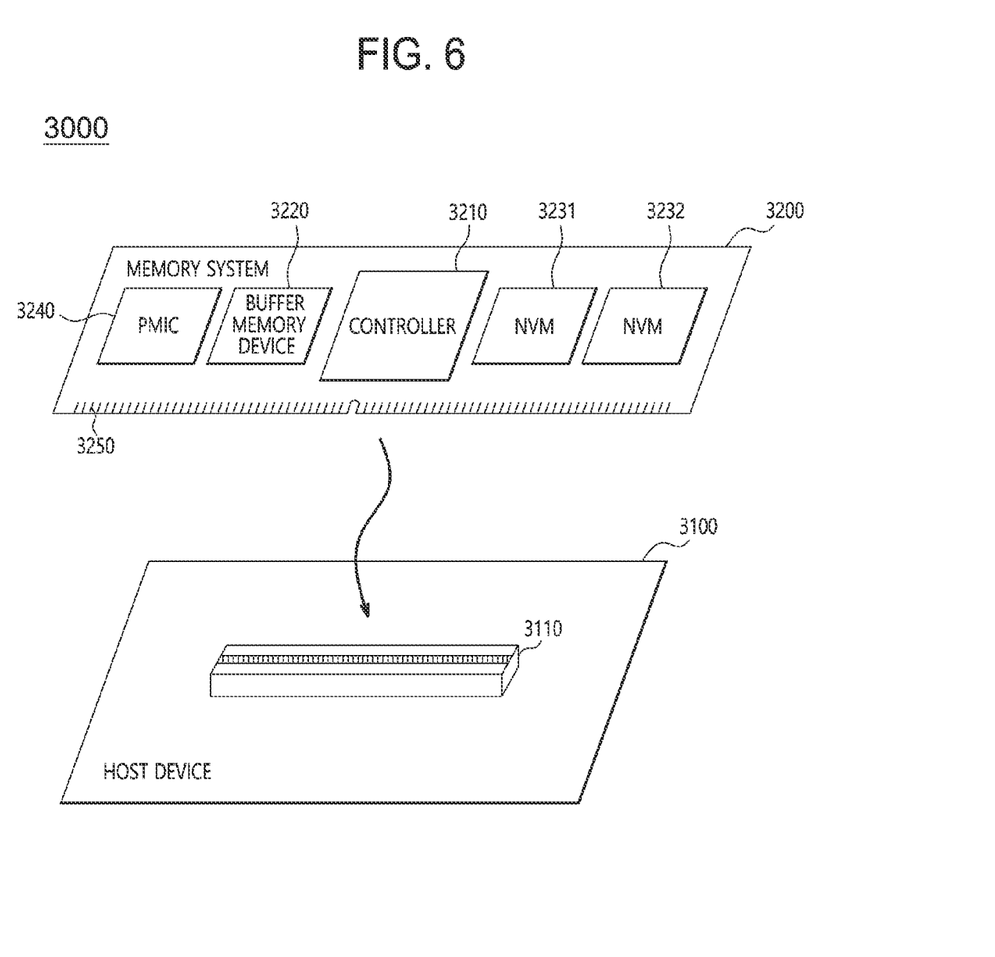
FIGS. 6 and 7 are diagrams illustrating a data processing system in accordance with an embodiment of the present disclosure.

FIG. 6 is a diagram illustrating a data processing system 3000, in accordance with an embodiment of the present disclosure. Referring to FIG. 6, the data processing system 3000 may include a host device 3100 and a memory system 3200.

The host device 3100 may be referred as the external device, and the memory system 3200 may be the electronic device 100 shown in FIGS. 1 and 2.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. In an embodiment, the controller 3210 may include heat management circuit 130 shown in FIGS. 1 and 2. The controller 3210 analyzes the cause of heat generation of the functional circuits including the nonvolatile memory devices 3231 to 3232 and may output results of the analysis to the external device.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 7:
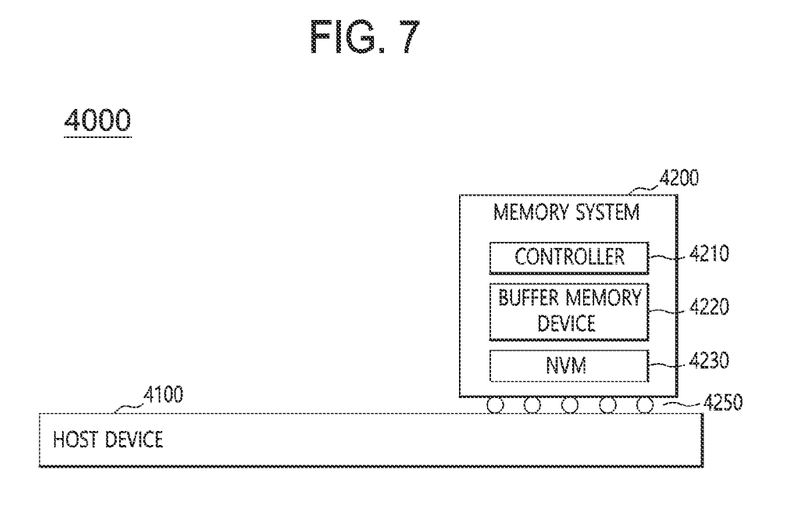

FIG. 7 is a diagram illustrating a data processing system 4000 in accordance with an embodiment of the present disclosure. Referring to FIG. 7, the data processing system 4000 may include a host device 4100 and a memory system 4200.

The host device 4100 may be referred as the external device, and the memory system 4200 may be the electronic device 100 shown in FIGS. 1 and 2.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. In an embodiment, the controller 4210 may include heat management circuit 130 shown in FIGS. 1 and 2. The controller 4210 analyzes the cause of heat generation of the functional circuits including the nonvolatile memory device 4230 and may output results of the analysis to the external device.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 8:
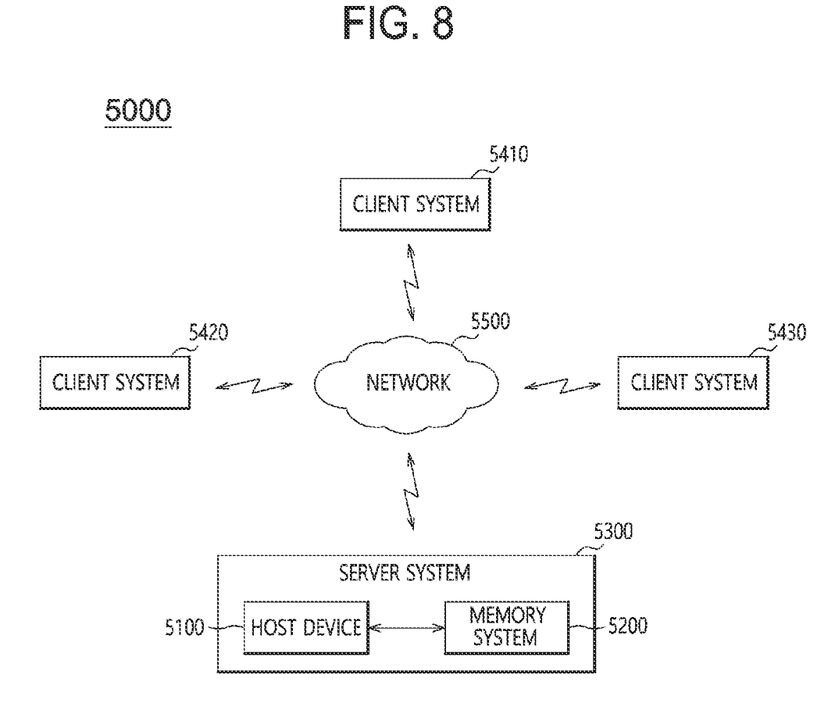
FIG. 8 is a diagram illustrating a network system including a data storage device in accordance with an embodiment of the present disclosure.

FIG. 8 is a diagram illustrating a network system 5000 including a data storage device, in accordance with an embodiment of the present disclosure. Referring to FIG. 8, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200.

The host device 5100 may be referred to as the external device. The memory system is configured to include the controller 110 comprising the heat management circuit 130 and the functional circuit group 120 comprising the data storage device, to analyze the cause of heat generation of the functional circuit group 12, and to output results of the analysis to the external device.

Figure 9:
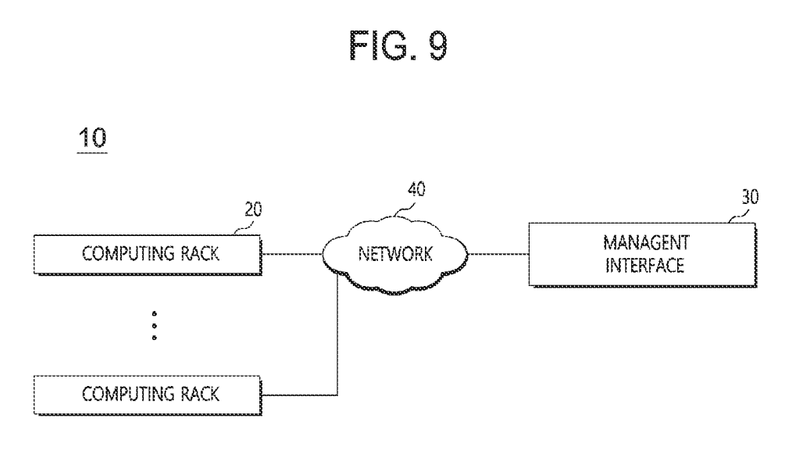
FIG. 9 illustrates a data processing system according to an embodiment of the present disclosure.

FIG. 9 illustrates a data processing system 10 according to an embodiment of the present disclosure. Referring to FIG. 9, the data processing system 10 may include a plurality of computing racks 20, a management interface 30, and a network 40 configured to enable communication between the computing racks 20 and the management interface 30. The data processing system 10 may have the rack-scale architecture, and may be used in a data center or the like for large-scale data processing.

Each of the plurality of computing racks 20 may implement one computing system in combination with other computing racks 20. Detailed configurations and operations of the computing racks 20 will be described later.

The management interface 30 may provide interactive interfacing for a user to control, operate, or manage the data processing system 10. The management interface 30 may be implemented using any type of a computing device including any of a computer, a multi-processor system, a server, a rack-mount server, a board server, a lap-top computer, a desk-top computer, a tablet computer, a wearable computing system, a network device, a web device, a distributed computing system, a processor-based system, a customer electronic device, and so on.

In some embodiments, the data processing system 10 may be implemented with a distributed system having computing functions to be performed by the computing racks 20 and user interface functions to be performed by the management interface 30. In other embodiments, the data processing system 10 may be implemented with a virtual cloud server that includes multi-computing devices distributed through the network 40. The management interface 30 may include a processor, an input/output (I/O) subsystem, a memory, a data storage device, and a communication circuit.

The network 40 may be a channel which exchanges data between the computing racks 20 and the management interface 30 and/or between the computing racks 20. The network 40 may be implemented by various wired and/or wireless networks. For example, the network 40 may include a publicly accessible global network, such as a wired/wireless local area network (LAN), a wide area network (WAN), a cellular network, and/or the Internet. In another example, the network 40 may include one or more subsidiary (or auxiliary) network devices, such as subsidiary (or auxiliary) computers, routers, and switches. In another example, the network 40 may include an interface network based on interface standards, such as cache coherent interconnect for accelerators (CCIX) and GEN-Z.

Figure 10:
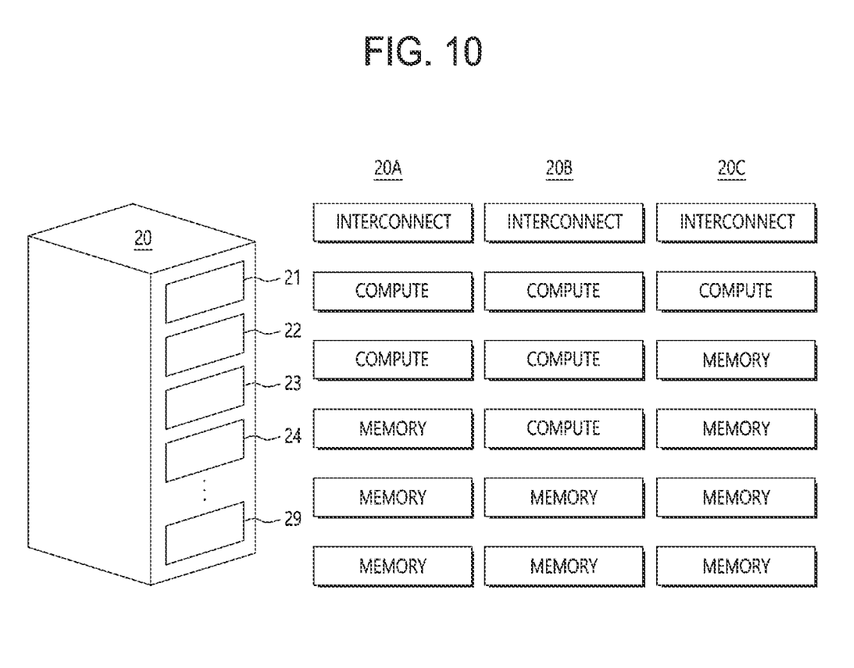
FIG. 10 illustrates architecture of a computing rack according to an embodiment of the present disclosure.

FIG. 10 illustrates architecture of a computing rack 20 according to an embodiment of the present disclosure.

Referring to FIG. 10, the computing rack 20 may not be limited by structures, types, and names of components and the like, and the computing rack 20 may include various types of components. For example, the computing rack 20 may include a plurality of drawers 21 to 29. Each of the plurality of drawers 21 to 29 may include a plurality of boards.

In various embodiments, the computing rack 20 may be implemented by a combination of appropriate numbers of compute boards COMPUTE, memory boards MEMORY, and/or interconnect boards INTERCONNECT. Here, although it is defined that the computing rack 20 is implemented by a combination of the plurality of boards, it may be defined that the computing rack 20 is implemented by diversely named components such as drawers, modules, trays, boards, chassis, and units.

The components of the computing rack 20 may have architecture classified and distinguished according to their functions for convenience of implementation. The computing rack 20 may have architecture classified in order of an interconnect board, a compute board, and a memory board from the top, but this is not limited thereto. The computing rack 20 and a computing system implemented by the computing rack 20 may be referred to as "a rack-scale system" or "a disaggregated system." The memory board may be referred to as "a memory system". The memory board is configured to include the controller comprising the heat management circuit 130 and the functional circuit group 120 comprising the data storage device, to analyze the cause of heat generation of the functional circuit group 12, and to output results of the analysis to the external device.

In various embodiments, a computing system may be implemented by one computing rack 20. In other embodiments, a computing system may be implemented by all components included in two or more computing racks, some of components included in two or more computing racks, or some of components included in one computing rack 20.

In various embodiments, a computing system may be implemented by a combination of appropriate numbers of compute boards, memory boards, and interconnect boards included in the computing rack 20. As illustrated in FIG. 10, a computing rack 20A may be implemented by a combination of two compute boards COMPUTE, three memory boards MEMORY, and one interconnect board INTERCONNECT. In another example, a computing rack 20B may be implemented by a combination of three compute boards COMPUTE, two memory boards MEMORY, and one interconnect board INTERCONNECT. In still another example, a computing rack 20C may be implemented by a combination of one compute board COMPUTE, four memory boards MEMORY, and one interconnect board INTERCONNECT.

Although FIG. 10 illustrates a case where the computing rack 20 is implemented by a combination of appropriate numbers of compute boards, memory boards, and interconnect boards, the computing rack 20 may include additional components that may be included in typical servers, such as a power system, a cooling system, an I/O device, and the like.

The above-described embodiments of the present disclosure are intended to illustrate and not to limit embodiments of the present disclosure. Various alternatives and equivalents are possible. The invention is not limited by the embodiments described herein. Nor is the invention limited to any specific type of semiconductor device. Other additions, subtractions, or modifications are apparent in view of the present disclosure and are intended to fall within the scope of the appended claims. Furthermore, the embodiments may be combined to form additional embodiments.

What is claimed is:

1. A heat management circuit comprising:
a throttling circuit configured to cool, for a predetermined time amount, at least one semiconductor functional circuit, which is designed to perform a predetermined function, when a plurality of first temperature signals respectively transmitted from a plurality of temperature sensors installed in the semiconductor functional circuit satisfy a throttling condition; and
an analysis unit configured to:
receive, after lapse of the predetermined time amount, a plurality of second temperature signals from the respective temperature sensors,
determine whether the cooling is successful or fails,
detect a temperature sensor having outputted a second temperature signal of abnormal value when the cooling is determined to fail, and
determine whether a cause of heat generation is in the detected temperature sensor or in an environment around the detected temperature sensor.

2. The heat management circuit according to claim 1, wherein the throttling condition is that a first representative temperature calculated from the plurality of first temperature signals is equal to or greater than a first threshold.

3. The heat management circuit according to claim 1, wherein the throttling circuit cools the functional circuit through power-off of the functional circuit.

4. The heat management circuit according to claim 1,
wherein the analysis unit determines the cooling as successful when a second representative temperature calculated from the plurality of second temperature signals is less than a second threshold, and
wherein the throttling circuit is further configured to restart the functional circuit when the cooling is determined to be successful.

5. The heat management circuit according to claim 1, wherein the analysis unit determines the cooling to fail when a second representative temperature calculated from the plurality of second temperature signals is equal to or greater than a second threshold.

6. The heat management circuit according to claim 1,
wherein the analysis unit is further configured to calculate an average and deviations of the plurality of second temperature signals, and
wherein the analysis unit detects a temperature sensor, which has transmitted a second temperature signal having the deviation equal to or greater than a third threshold among the plurality of second temperature signals, as the temperature sensor having outputted the second temperature signal of abnormal value.

7. The heat management circuit according to claim 6, wherein the analysis unit is further configured to:
determine that there is an error in the detected temperature sensor having outputted the second temperature signal of abnormal value, and
transmit the cause of heat generation to an external device.

8. The heat management circuit according to claim 1, wherein the analysis unit is further configured to calculate an average and deviations of the plurality of second temperature signals, and wherein the analysis unit detects, when any temperature sensor having outputted a second temperature signal having a deviation equal to or greater than a third threshold is not detected among the plurality of second temperature signals, a temperature sensor, which has transmitted a second temperature signal having a maximum deviation among the plurality of second temperature signals, as the temperature sensor having outputted the second temperature signal of abnormal value.

9. The heat management circuit according to claim 8, wherein the analysis unit is further configured to:
determine that the cause of heat generation is in an environment around the temperature sensor having outputted the second temperature signal of abnormal value, and
transmit the cause of heat generation to an external device.

10. A method for operating a heat management circuit, the method comprising:
receiving a plurality of first temperature signals from a plurality of temperature sensors, respectively, installed in at least one semiconductor functional circuit designed to perform a predetermined function;
cooling the functional circuit for a predetermined time amount when the first temperature signals satisfy a throttling condition;
receiving, after lapse of the predetermined time amount, a plurality of second temperature signals from the respective temperature sensors;
determining whether cooling is successful or fails;
detecting a temperature sensor having outputted a second temperature signal of abnormal value when the cooling is determined to fail, and
determining whether a cause of heat generation is in the detected temperature sensor or in an environment around the detected temperature sensor.

11. The method according to claim 10, wherein the throttling condition is that a first representative temperature calculated from the plurality of first temperature signals is equal to or greater than a first threshold.

12. The method according to claim 10,
wherein the determining comprises determining the cooling is successful when a second representative temperature calculated from the plurality of second temperature signals is less than a second threshold, and
further comprising restarting the functional circuit when the cooling is determined to be successful.

13. The method according to claim 10, wherein the determining comprises determining the cooling has failed when a second representative temperature calculated from the plurality of second temperature signals is equal to or greater than a second threshold.

14. The method according to claim 10, further comprising calculating an average and deviations of the plurality of second temperature signals, and
wherein the detecting includes detecting a temperature sensor, which has transmitted a second temperature signal having a deviation equal to or greater than a third threshold among the plurality of second temperature signals, as the temperature sensor having outputted the second temperature signal of abnormal value.

15. The method according to claim 14, further comprising:
determine that there is an error in the detected temperature sensor having outputted the second temperature signal of abnormal value; and transmitting the cause of heat generation to an external device.

16. The method according to claim 10,
further comprising calculating an average and deviations of the plurality of second temperature signals, and
wherein the detecting includes detecting, when any temperature sensor having outputted a second temperature signal having a deviation equal to or greater than a third threshold is not detected among the plurality of second temperature signals, a temperature sensor, which has transmitted a second temperature signal having a maximum deviation among the plurality of second temperature signals, as the temperature sensor having outputted the second temperature signal of abnormal value.

17. The method according to claim 16, further comprising:
determining that the cause of heat generation is in an environment around the temperature sensor having outputted the second temperature signal of abnormal value; and
transmitting the cause of heat generation to an external device.

18. An electronic device comprising:
at least one semiconductor functional circuit designed to perform a predetermined function;
a plurality of temperature sensors configured to detect a temperature of the functional circuit;
a throttling circuit configured to limit an operation of the functional circuit for a predetermined time amount when a first representative temperature calculated on the basis of first temperature signals respectively received from the plurality of temperature sensors is equal to or greater than a first threshold; and
an analysis unit configured to determine, when a second representative temperature calculated from second temperature signals received from the respective temperature sensors after lapse of the predetermined time amount is equal to or greater than a second threshold, whether a cause of heat generation is in at least one temperature sensor or in an environment around at least one temperature sensor on a basis of deviations of the second temperature signals.

19. The electronic device according to claim 18, wherein the analysis unit is configured to determine the cause of heat generation by detecting a temperature sensor having outputted a second temperature signal having a deviation equal to or greater than a third threshold among the plurality of second temperature signals.

20. The electronic device according to claim 18, wherein the analysis unit is configured to determine the cause of heat generation by detecting, when any temperature sensor having outputted a second temperature signal having a deviation equal to or greater than a third threshold is not detected among the plurality of second temperature signals, a temperature sensor having outputted a second temperature signal having a maximum deviation among the plurality of second temperature signals.

* * * * *